US012625943B2

(12) United States Patent
Chen et al.

(10) Patent No.: US 12,625,943 B2
(45) Date of Patent: May 12, 2026

(54) USB PERIPHERAL AUTHENTICATION METHOD, EMBEDDED SYSTEM, AND STORAGE MEDIUM

(71) Applicant: HUIZHOU DESAY SV INTELLIGENT TRANSPORTATION TECHNOLOGICAL INSTITUTE CO., LTD, Guangdong (CN)

(72) Inventors: Zhixin Chen, Guangdong (CN); Caihui Zhang, Guangdong (CN)

(73) Assignee: HUIZHOU DESAY SV INTELLIGENT TRANSPORTATION TECHNOLOGICAL INSTITUTE CO., LTD, Guangdong (CN)

( * ) Notice: Subject to any disclaimer, the term of this patent is extended or adjusted under 35 U.S.C. 154(b) by 55 days.

(21) Appl. No.: 18/725,159

(22) PCT Filed: Sep. 25, 2023

(86) PCT No.: PCT/CN2023/121135
§ 371 (c)(1),
(2) Date: Jun. 28, 2024

(87) PCT Pub. No.: WO2024/103965
PCT Pub. Date: May 23, 2024

(65) Prior Publication Data
US 2025/0061184 A1     Feb. 20, 2025

(30) Foreign Application Priority Data
Nov. 17, 2022     (CN) .......................... 202211461532.6

(51) Int. Cl.
*G06F 21/44*        (2013.01)
*G06F 21/60*        (2013.01)
*G06F 21/64*        (2013.01)

(52) U.S. Cl.
CPC ............ *G06F 21/44* (2013.01); *G06F 21/602* (2013.01); *G06F 21/64* (2013.01)

(58) Field of Classification Search
CPC ........ G06F 21/44; G06F 21/602; G06F 21/64; G06F 21/31; G06F 21/33; H04L 9/08; H04L 9/32; H04L 9/40
See application file for complete search history.

(56) References Cited

U.S. PATENT DOCUMENTS

2018/0309580 A1* 10/2018 Jeon ....................... H04L 9/0643
2021/0044575 A1*  2/2021 Kong .................. H04L 63/0428

FOREIGN PATENT DOCUMENTS

CN        108737104 A  * 11/2018  ......... H04L 63/0823
CN        114900312 A  *  8/2022  ........... H04L 9/3247

* cited by examiner

*Primary Examiner* — Harunur Rashid
(74) *Attorney, Agent, or Firm* — Birchwood IP

(57)        ABSTRACT

USB device authentication, and in particular to a USB peripheral authentication method, an embedded system, and a storage medium. The method includes: verifying a user identity, and accessing a USB device authentication credential generation program of a legitimate user; acquiring USB device ID information, embedded system ID information, and a salt value generated by a random number generator; associating the information by means of a secure unit, using the information as an input, generating a key pair, and issuing a self-signed certificate; placing the information into a storage area of the secure unit, and returning the self-signed certificate and the salt value to the USB device or the user; and when the USB device is accessed, verifying whether the information matches, if yes, activating a USB communication function, or otherwise, disabling the communication function of the USB device.

14 Claims, 6 Drawing Sheets

USB PERIPHERAL AUTHENTICATION METHOD, EMBEDDED SYSTEM, AND STORAGE MEDIUM

TECHNICAL FIELD

The present invention relates to the technical field of USB device authentication, in particular to a USB peripheral authentication method, an embedded system, and a storage medium.

BACKGROUND OF THE INVENTION

In embedded systems, such as in-vehicle infotainment (IVI) products of automotive electronics, it is necessary to provide universal serial bus (USB) interfaces and corresponding connection functions externally, and users can connect USB flash drives, USB HID (a USB communication protocol), mobile phones and other devices thereto to use USB multimedia playback, IVI games, mobile phone interconnection and other functions, so as to get a rich smart cabin experience.

However, there are natural defects in the security of the USB protocol, and any USB device can enumerate itself into any type of USB device to achieve the corresponding functions as long as the device is in accordance with the definition of the USB protocol. For example, firmware can enumerate itself into a USB keyboard via a customized USB disk, and after the keyboard has access to the embedded system, malicious codes can be accessed or downloaded to a machine by typing a link to a malicious website through the keyboard. A USB charger can also be enumerated as a USB transmission device to steal the data of the system. This kind of attack based on modification of USB device firmware cannot be identified by security protection measures such as anti-virus software, and the use of USB peripherals in current embedded systems has security risks.

BRIEF SUMMARY OF THE INVENTION

In order to solve the technical problem that in a current embedded system, a USB peripheral is prone to being enumerated as a USB transmission device and stealing the data of the system, the present invention provides a USB peripheral authentication method, an embedded system, and a storage medium.

In order to solve the above-mentioned technical problems, the present invention adopts the following technical solutions.

A USB peripheral authentication method is applied to an embedded system. The system includes a security unit, a storage unit and a processor. The method includes:

verifying an identity of a user and accessing a USB device authentication credential generation program for a legitimate user;

acquiring ID information of a USB device, ID information of the embedded system, and a salt value generated by a random number generator;

associating the ID information of the USB device, the ID information of the embedded system, and the salt value generated by the random number generator through the security unit, and using same as an input for generating a key pair and issuing a self-signed certificate;

inserting the ID information of the USB device, the ID information of the embedded system, the salt value, and the key pair in a storage area of the security unit, and returning the self-signed certificate and the salt value to the USB device or the user;

when the USB device is accessed, verifying whether the self-signed certificate and the salt value of the USB device or the user match the information in the storage area of the security unit; if yes, activating a USB communication function; otherwise, disabling the communication function of the USB device.

Further, after the accessing a USB device authentication credential generation program for a legitimate user, the method further includes:

checking whether the accessed USB device has a storage function;

if the USB device has the storage function, after generating the key pair and issuing the self-signed certificate, storing the self-signed certificate and the salt value in a hidden partition of the USB device, and calling, during verification, the self-signed certificate and the salt value in the hidden partition of the USB device for verification; and if the USB device does not have the storage function, setting a password after reading the USB device, returning the salt value to the user after the salt value is generated, storing the self-signed certificate in the storage area of the security unit, and reading, during verification, the password and the salt value entered by the user for verification.

Further, the calling the self-signed certificate and the salt value in the hidden partition of the USB device for verification includes:

calling the salt value and the self-signed certificate in the hidden partition of the USB device, and searching for the key pair in the storage area of the security unit according to the salt value;

verifying the self-signed certificate through the key pair obtained by searching to determine whether the information of the self-signed certificate matches the information in the storage area of the security unit;

if yes, activating the communication function of the USB device; otherwise, disabling the communication of the USB device.

Further, the setting a password after reading the USB device includes:

prompting the user to enter the password through the human-computer interaction interface;

receiving the password through a security keyboard of the security unit, calculating a hash value of the password in the security unit and storing same; and using the hash value of the password as one of the inputs to generate the key pair and issue the self-signed certificate.

Further, the reading, during verification, the password and the salt value entered by the user for verification specifically includes:

prompting the user to input the salt value through the human-computer interaction interface;

acquiring a key according to the input salt value, and extracting a password hash value and verification information from the self-signed certificate through the key;

prompting the user to enter the password through the human-computer interaction interface;

calculating the hash value of the input password and comparing same with the password hash value in the self-signed certificate;

if the two hash values are consistent, determining whether the information of the self-signed certificate matches the information in the storage area of the security unit;

if yes, activating the communication function of the USB device; otherwise, disabling the communication of the USB device.

Further, the acquiring ID information of a USB device, ID information of the embedded system, and a salt value generated by a random number generator includes:

reading the ID information of the USB device;

acquiring the ID information of the embedded system; and generating a random number through the random number generator of the security unit as the salt value.

Further, the ID information of the USB device includes a device ID and a manufacturer ID, and the ID information of the embedded system includes a manufacturer ID, a model ID and a processor ID.

Further, the security unit includes one of TEE and SE.

In a second aspect, the present invention further provides an embedded system. The embedded system is characterized by including:

a security unit configured to provide a secure authentication environment for a USB device;

a storage unit configured to store ID information of the embedded system;

a random number generator configured to generate a salt value; and a processor configured to handle data interaction during authentication of the USB device, the processor calling the security unit, the storage unit, and the random number generator to perform the USB peripheral authentication method described above.

In a third aspect, the present invention further provides a storage medium, which is non-transitory in nature. The storage medium is characterized in that the storage medium has a computer program stored thereon, and the computer program, when executed by a processor, implements the USB peripheral authentication method described above.

According to the present invention, after the user identity is verified, credentials are added to the accessed USB device through the USB peripheral authentication method of the present invention, and during subsequent USB access, whether the communication function can be accessed is determined by verifying the pre-retained authentication data, so as to ensure that only authorized USB peripherals can perform USB communication, which improves the reliability and security for the USB device to have access to the embedded system. The authentication method is reliable and effective, can be used for USB peripherals that lack storage capacity, and can solve the problem that current embedded systems lack mechanisms to detect the legitimacy of USB devices having access to the systems.

DETAILED DESCRIPTION OF THE INVENTION

In order to make the objects, technical solutions and advantages of the present invention more clear, the present invention is further described in detail below with reference to the accompanying drawings and the embodiments. It is to be understood that the specific embodiments described herein are merely illustrative of the present invention, and are not intended to limit the present invention.

Embodiment 1

This embodiment provides a USB peripheral authentication method which is applied to an embedded system. An authentication credential is generated for an accessed USB device through interaction with a user with a legal identity, and in the subsequent access process, the authentication credential is verified to determine whether the communication function between the embedded system and the accessed USB device is enabled, which prevents malicious USB devices from attacking embedded systems after being accessed, and improves the security and reliability of USB access to the embedded system.

Figure 1:
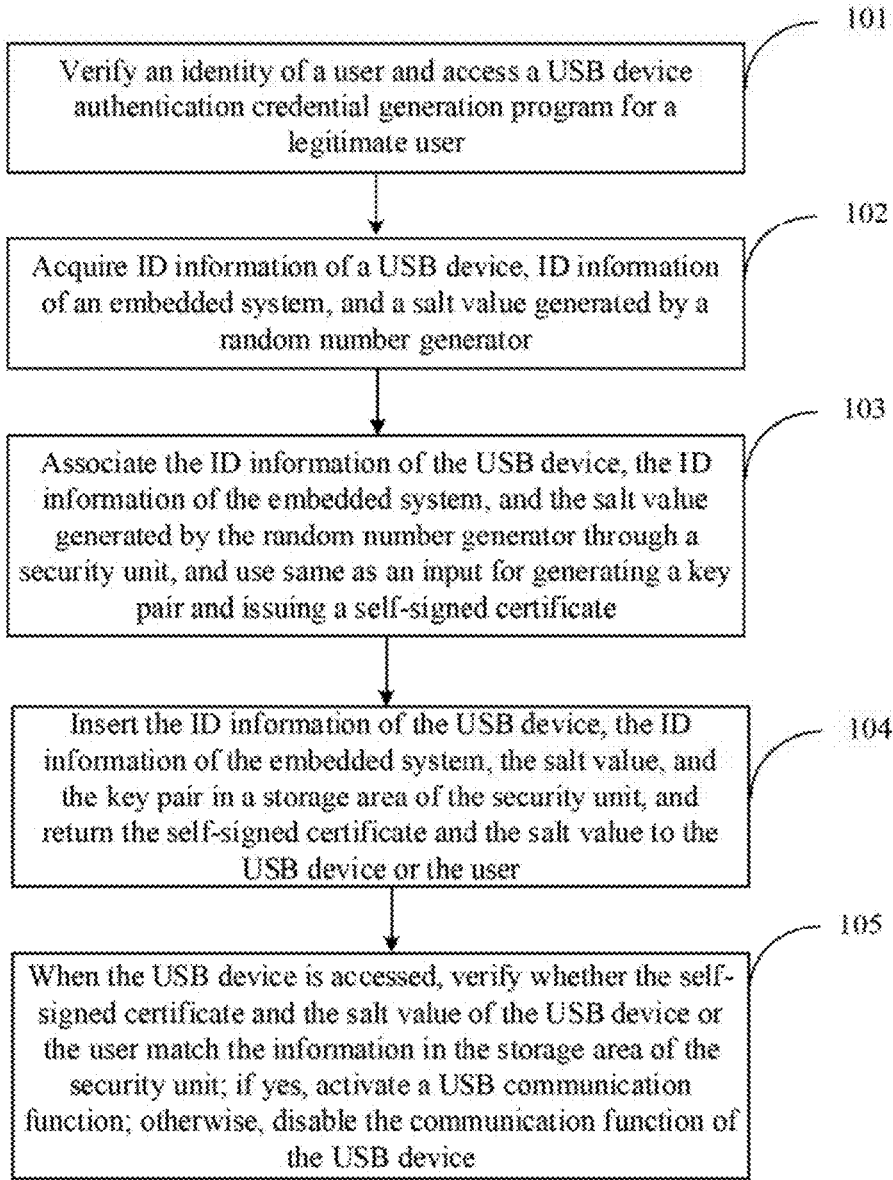
FIG. 1 shows a structural flowchart of a USB peripheral authentication method according to an embodiment of the present invention.

Specifically, referring to FIG. 1, FIG. 1 shows a structural flowchart of a USB peripheral authentication method according to an embodiment of the present invention. The USB peripheral authentication method in this embodiment is applied to an embedded system. The embedded system at least includes a security unit, a storage unit and a processor. The USB peripheral authentication method specifically includes:

101, verify an identity of a user and access a USB device authentication credential generation program for a legitimate user.

The processor of the embedded system verifies the identity of the user and, if the identity of the user is legitimate, allows the user to start adding a trusted USB device, that is, to generate an authentication credential used for verification when the USB device is accessed. It may be prompted to verify the legality of the identity of the user when the user needs to add a trusted USB device. For example, when a user needs to add a trusted USB device and enters a corresponding command, the processor of the embedded system interacts with the user, prompts the user to enter a static password, receives the static password, and verifies whether the password is consistent with a password stored in the embedded system. If yes, the identity of the user is legitimate, and the authentication credential of the USB device may be generated. If no, the authentication credential generation program for the accessed USB device is denied.

102, acquire ID information of the USB device, ID information of the embedded system, and a salt value generated by a random number generator.

103, associate the ID information of the USB device, the ID information of the embedded system, and the salt value generated by the random number generator through the security unit, and use same as an input to generate a key pair and issue a self-signed certificate.

In the authentication credential generation program, the processor reads the ID information of the USB device, the ID information of the embedded system and the salt value, and then associates same to generate the key pair and issue the self-signed certificate. The ID information of the USB device represents the identity of the USB device, the ID information of the embedded system represents the identity of the embedded system, and the salt value is used to call the key pair. The self-signed certificate is one of the verification information, and the ID information of the USB device and the ID information of the embedded system may be entered into same as secondary verification information.

For example, during verification, the processor may call the key pair based on the salt value, and may verify the self-signed certificate through the key, and read the verification information in the self-signed certificate. Through the secondary verification of the verification information of the self-signed certificate, whether the identity of the USB device is legitimate may be determined.

104, insert the ID information of the USB device, the ID information of the embedded system, the salt value, and the key pair in a storage area of the security unit, and return the self-signed certificate and the salt value to the USB device or the user.

After the authentication credential is generated, the data such as the ID information of the USB device, the ID information of the embedded system, the salt value, the key pair and the self-signed certificate are inserted in the storage area of the security unit of the embedded system, and the salt value is returned to the USB device or user. Of course, if the USB device does not have the storage capacity, the self-signed certificate cannot be stored in the USB device, but stored in the embedded system and extracted during verification.

105, when the USB device is accessed, verify whether the self-signed certificate and the salt value of the USB device or the user match the information in the storage area of the security unit; if yes, activate a USB communication function; otherwise, disable the communication function of the USB device.

In the verification process, the processor calls the key pair in the storage area of the security unit according to the salt value provided by the USB device to verify whether the self-signed certificate matches. If yes, whether the secondary verification information in the self-signed certificate matches is verified one by one. If all match, the USB communication function of the embedded system is activated. Otherwise, communication between the embedded system and the USB device is disabled.

Preferably, after the step of accessing a USB device authentication credential generation program for a legitimate user, the method further includes:

check whether the accessed USB device has a storage function;

if the USB device has the storage function, after generating the key pair and issuing the self-signed certificate, store the self-signed certificate and the salt value in a hidden partition of the USB device, and call, during verification, the self-signed certificate and the salt value in the hidden partition of the USB device for verification; and if the USB device does not have the storage function, set a password after reading the USB device, return the salt value to the user after the salt value is generated, store the self-signed certificate in the storage area of the security unit, and read, during verification, the password and the salt value entered by the user for verification.

USB devices are different, some have the storage function, while others do not. Therefore, the processor checks whether a USB device has the storage function to adjust information input for generating the key pair and issuing the self-signed certificate, as well as subsequent storage methods of the self-signed certificate and the salt value.

For example, if the USB device has the storage function, the self-signed certificate and the salt value may be stored in the USB device. When the USB device is accessed subsequently, the self-signed certificate and the salt value may be directly called for verification. If the USB device does not have the storage function, the USB device cannot store the self-signed certificate and the salt value, and thus when the key pair is generated and the self-signed certificate is issued, a password is set to verify the self-signed certificate. In this way, the self-signed certificate is stored in the storage area of the security unit of the embedded system, and the salt value is returned to the user, so the user may perform verification subsequently by inputting the salt value.

Further preferably, under the premise that the USB device has the storage function, the step of calling the self-signed certificate and the salt value in the hidden partition of the USB device for verification includes:

call the salt value and the self-signed certificate in the hidden partition of the USB device, and search for the key pair in the storage area of the security unit according to the salt value;

verify the self-signed certificate through the key pair obtained by searching to determine whether the information of the self-signed certificate matches the information in the storage area of the security unit;

if yes, activate the communication function of the USB device; otherwise, disable the communication of the USB device.

If the USB device has the storage function, the processor calls the salt value and the self-signed certificate in the USB device to verify same with the verification information in the storage area of the security unit to determine whether the credential of the USB device is legitimate.

Also preferably, under the premise that the USB device does not have the storage function, in terms of password verification, the step of setting a password after reading the USB device includes:

prompt the user to enter the password through the human-computer interaction interface;

receive the password through a security keyboard of the security unit, calculate a hash value of the password in the security unit and storing same; and use the hash value of the password as one of the inputs for generating the key pair and issuing the self-signed certificate.

If the USB device does not have the storage function, the self-signed certificate is stored in the storage area of the security unit. Therefore, the user enters the password to verify the self-signed certificate. Therefore, after the user sets the password, the hash value of the password needs to be entered into the self-signed certificate as one of the inputs for generating the key pair and issuing the self-signed certificate to be used as one of the verification information for the self-signed certificate.

As one of the above preferred embodiments, under the premise that the USB device does not have the storage function, in terms of verification, the step of reading, during verification, the password and the salt value entered by the user for verification specifically includes:

prompt the user to input the salt value through the human-computer interaction interface;

acquire a key according to the input salt value, and extract a password hash value and verification information from the self-signed certificate through the key;

prompt the user to enter the password through the human-computer interaction interface;

calculate the hash value of the input password and compare same with the password hash value in the self-signed certificate;

if the two hash values are consistent, determine whether the information of the self-signed certificate matches the information in the storage area of the security unit;

if yes, activate the communication function of the USB device; otherwise, disable the communication of the USB device.

If the USB device does not have the storage function, the user is prompted to enter the password and the salt value to verify the self-issued certificate and internal information.

Preferably, the step of acquiring ID information of a USB device, ID information of the embedded system, and a salt value generated by a random number generator includes:

reading the ID information of the USB device; acquiring the ID information of the embedded system; and generating a random number through the random number generator of the security unit as the salt value.

The ID information of the USB device includes a device ID and a manufacturer ID, and the ID information of the embedded system includes a manufacturer ID, a model ID and a processor ID. The ID information may verify whether the identity of the USB device is legitimate.

Preferably, the security unit includes one of a trusted execution environment (TEE) or a secure element (SE). The security unit is mainly used to provide a secure authentication environment for USB devices. The process of generating the key pair and issuing the self-signed certificate and the verification of the USB device are carried out in the security unit to ensure the reliability of verification.

For better operational experience, a specific implementation in this embodiment is provided.

Figure 2:
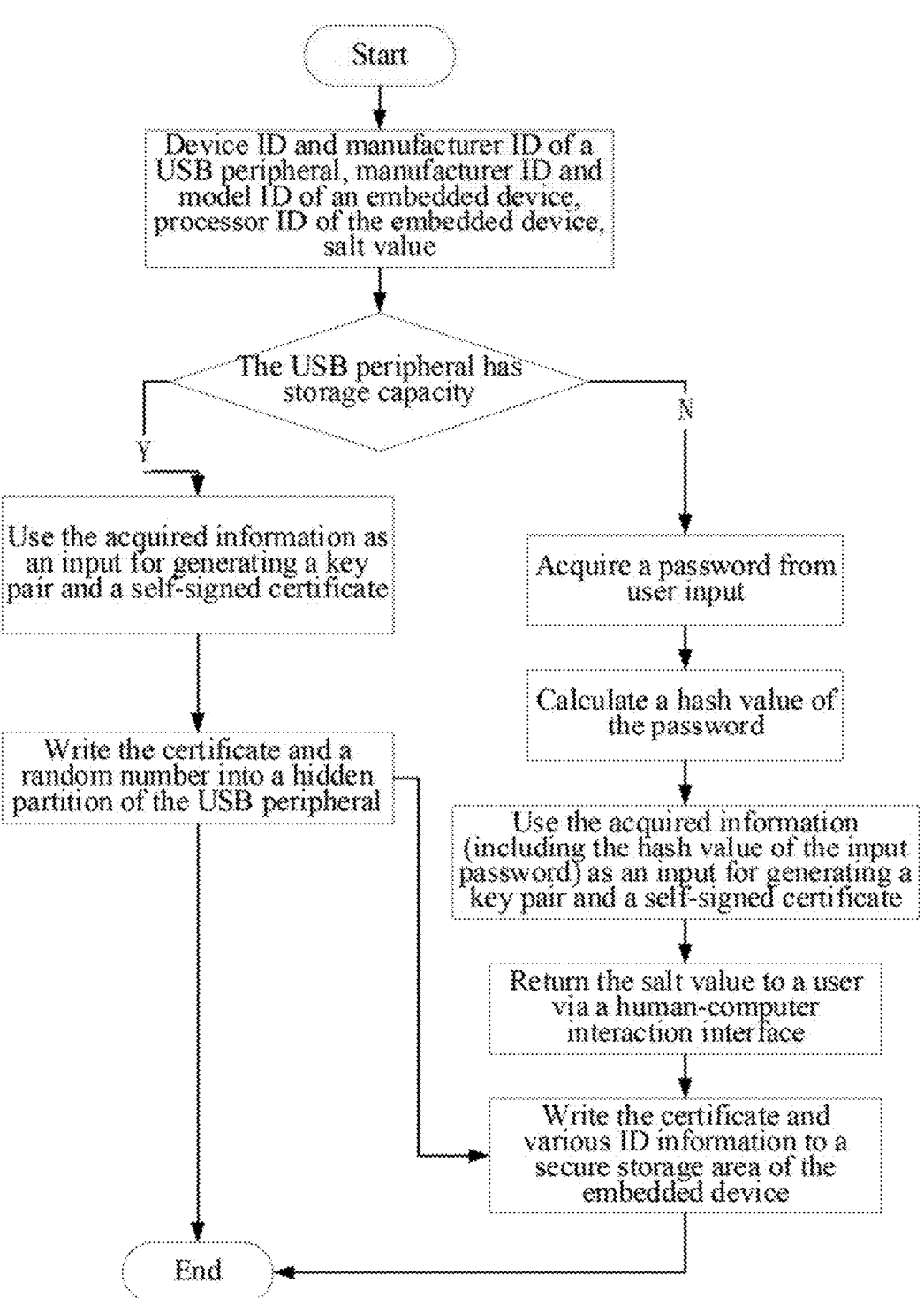
FIG. 2 shows a flowchart of the process of generating a USB device authentication credential according to an embodiment of the present invention.
Figure 3:
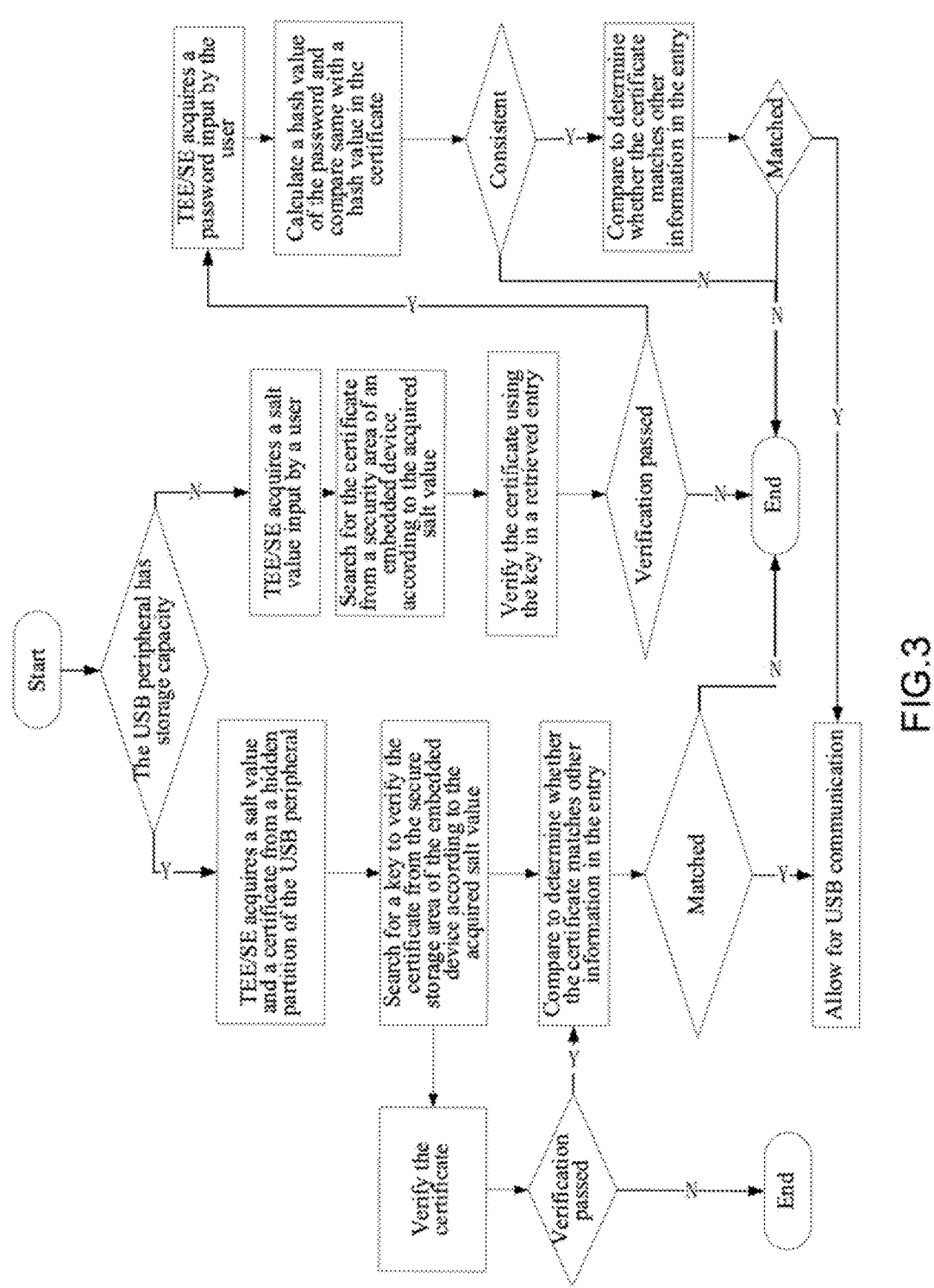
FIG. 3 shows a flowchart of the process of USB device authentication according to an embodiment of the present invention.
Figure 4:
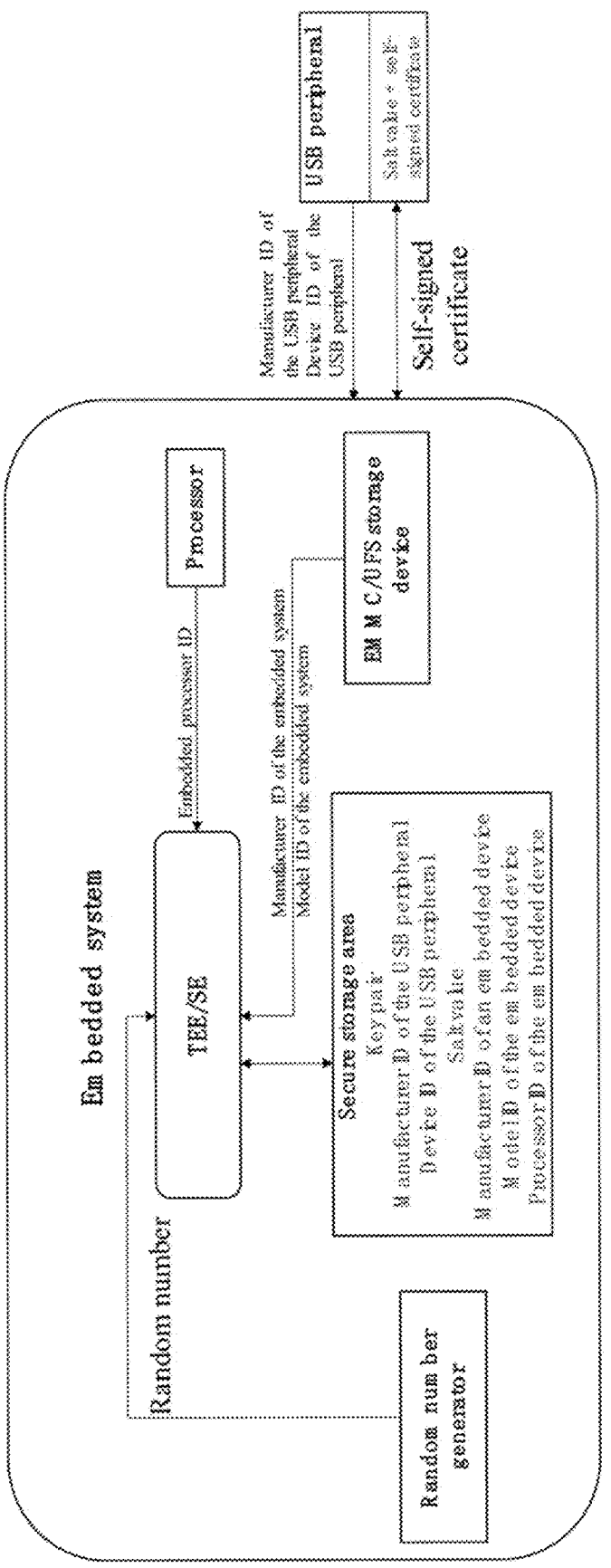
FIG. 4 shows a verification scheme for a USB device with storage capacity according to an embodiment of the present invention.
Figure 5:
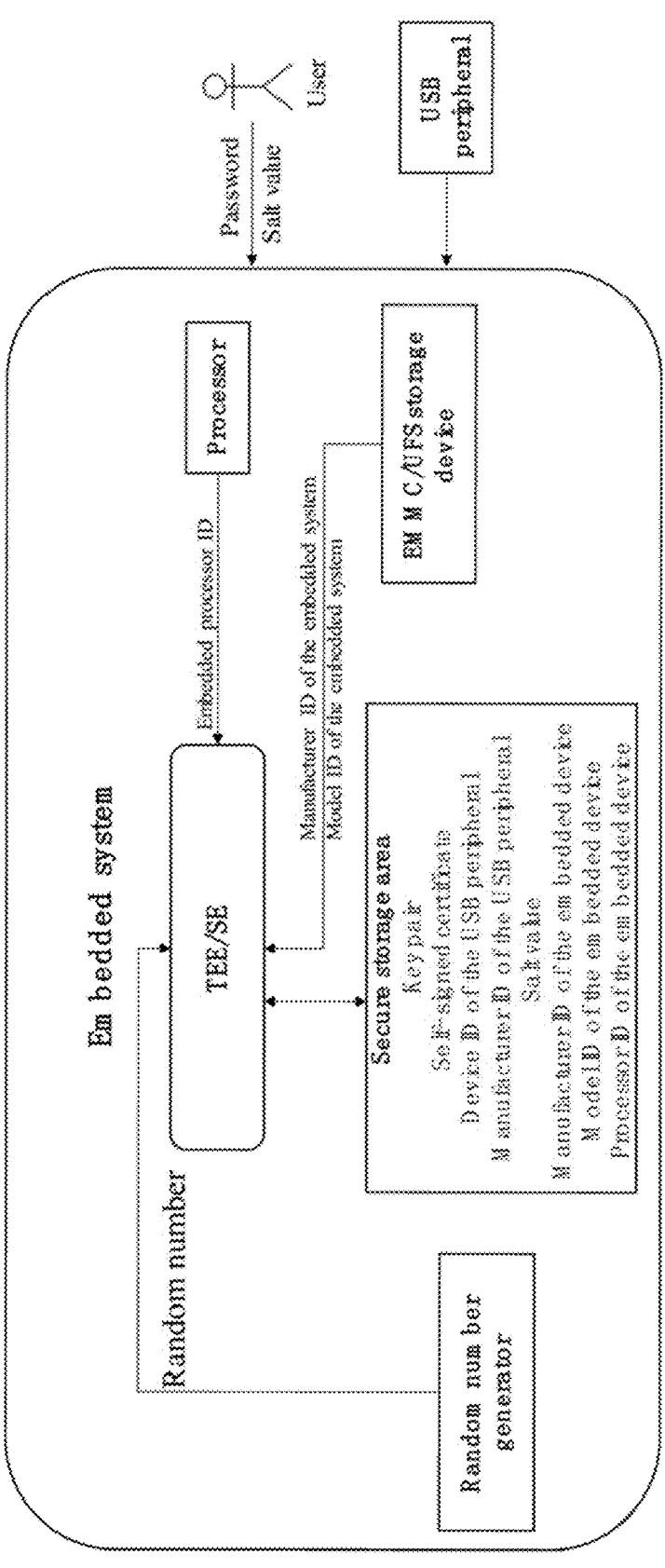
FIG. 5 shows a verification scheme for a USB device without storage capacity according to an embodiment of the present invention.

Referring to FIG. 2 to FIG. 5, FIG. 2 shows the flowchart of generating a USB device authentication credential in this embodiment; FIG. 3 shows the flowchart of the process of USB device authentication in this embodiment; FIG. 4 shows the verification scheme for a USB device with the storage capacity in this embodiment; and FIG. 5 shows the verification scheme for a USB device that does not have the storage capacity in this embodiment.

Referring to FIG. 2, the processor of the embedded system verifies the identity of the user. If the identity of the user is legitimate, the user is allowed to start adding a trusted USB device, that is, the user accesses the USB device he trusts to the embedded system, and the embedded system reads the device ID and the manufacturer ID of the USB device, and acquires the manufacturer ID, model ID, and processor ID of the embedded system. At the same time, random numbers are generated by the random number generator of the TEE or SE as the salt value.

Due to differences in USB devices, some USB devices do not have the storage capacity, so the processor checks whether a USB device has the storage capacity.

If yes, that is, the USB device has the storage capacity, in a trusted environment such as the TEE or SE, the processor uses the ID information of the USB device, the ID information of the embedded system, and the salt value as an input to generate the key pair and issue the self-signed certificate. Subsequently, also in a trusted environment such as the TEE or SE, the key pair, the ID information of the USB device, the ID information of the embedded system, and the salt value are associated and stored in a secure storage area that only the TEE or SE may access. The self-signed certificate and the salt value are stored to the hidden partition of the USB device.

If no, that is, the USB device does not have the storage capacity, the embedded system prompts the user to enter the password through the human-computer interaction interface. The password is received by the security keyboard on the TEE or SE side, and the hash value of the password is calculated in the TEE or SE. In a trusted environment such as the TEE or SE, the ID information of the USB device, the ID information of the embedded system, the salt value, and the hash value of the password are used as an input to generate the key pair and issue the self-signed certificate. Also in a trusted environment such as the TEE or SE, the hash value of the user password, the self-signed certificate, the key pair, the ID information of the USB device, the ID information of the embedded system, and the salt value are associated and stored in a secure storage area that only the TEE or SE may access. At the same time, the salt value is returned to the user via the human-computer interaction interface.

The preceding describes the process of generating the authentication credential of the USB device. FIG. 4 and FIG. 5 show the hardware status after the credential is generated.

In the verification process, referring to FIG. 3, the verification method is also different depending on whether the USB device has the storage function. Specifically, when a USB device has access to an embedded system, the processor checks whether the USB device has the storage capacity.

If yes, that is, the USB device has the storage capacity, the embedded system acquires the salt value in the hidden partition of the USB peripheral through the security unit, and searches the secure storage area according to the salt value for the corresponding key pair. In a trusted environment such as the TEE or SE, the certificate in the hidden partition of the USB device is verified with the key obtained by searching. If the verification is successful, the ID information of the USB device and the ID information of the embedded system are acquired from the certificate, and compared with entries in the storage area of the security unit one by one. If all match, the related USB communication function is activated. Otherwise, communication between the embedded system and the USB device is disabled.

If no, that is, the USB device does not have the storage capacity, the processor prompts, on the human-computer interaction interface, the user to enter the salt value through the security keyboard. After the user enters the salt value, the processor searches the storage area of the security unit for the corresponding key according to the salt value. In a trusted environment such as the TEE or SE, the certificate in the entry is verified with the key obtained by searching. If the verification is successful, the password hash value in the certificate is extracted. The processor prompts, on the human-computer interaction interface, the user to enter the password through the security keyboard, and calculates the hash value of the password. The hash value in the certificate is compared with the password hash value entered by the user to determine whether the two hash values are consistent. If yes, the ID information of the USB device and the ID information of the embedded system are acquired from the certificate and compared with the entries in the secure storage area one by one. If all match, the related USB communication function is activated; otherwise, communication between the embedded system and the USB device is disabled.

The advantages of the embodiment are that after the user identity is verified, credentials are added to the accessed USB device through the USB peripheral authentication method of the present invention, and during subsequent USB access, whether the communication function can be accessed is determined by verifying the pre-retained authentication data, so as to ensure that only authorized USB peripherals can perform USB communication, which improves the reliability and security for the USB device to have access to the embedded system. The authentication method is reliable and effective, can be used for USB peripherals that lack storage capacity, and can solve the problem that current embedded systems lack mechanisms to detect the legitimacy of USB devices having access to the systems.

Embodiment 2

Figure 6:
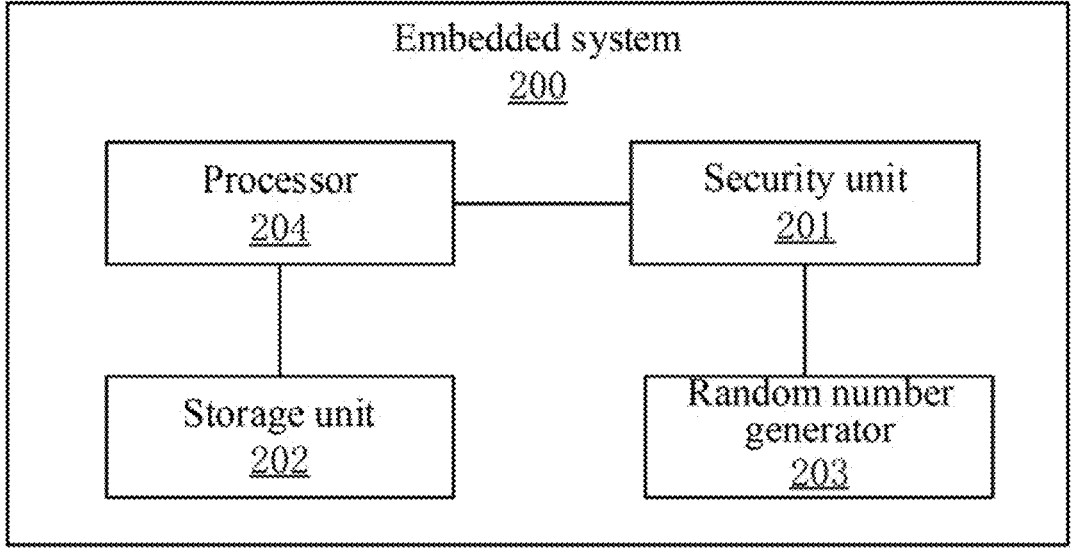
FIG. 6 shows a block diagram of the structure of an embedded system according to an embodiment of the present invention.

FIG. 6 shows a block diagram of the structure of an embedded system.

Referring to FIG. 6, the embedded system in this embodiment specifically includes:

a security unit 201 configured to provide a secure authentication environment for a USB device;

a storage unit 202 configured to store ID information of the embedded system;

a random number generator 203 configured to generate a salt value; and a processor 204 configured to handle data interaction during authentication of the USB device.

Specifically, the processor 204 calls the security unit 201, the storage unit 202, and the random number generator 203 to perform the USB peripheral authentication method. The USB peripheral authentication method specifically includes:

verify an identity of a user and access a USB device authentication credential generation program for a legitimate user;

acquire ID information of the USB device, ID information of the embedded system, and a salt value generated by a random number generator 203;

associate the ID information of the USB device, the ID information of the embedded system, and the salt value generated by the random number generator 203 through the security unit 201, and use same as an input for generating a key pair and issuing a self-signed certificate;

insert the ID information of the USB device, the ID information of the embedded system, the salt value, and the key pair in a storage area of the security unit 201, and return the self-signed certificate and the salt value to the USB device or the user;

when the USB device is accessed, verify whether the self-signed certificate and the salt value of the USB device or the user match the information in the storage area of the security unit 201; if yes, activate a USB communication function; otherwise, disable the communication function of the USB device.

Specifically, the USB peripheral authentication method in this embodiment is the USB peripheral authentication method in Embodiment 1.

Embodiment 3

This embodiment provides a storage medium, which is non-transitory in nature, having a computer program stored thereon. The computer program, when executed by a processor, implements the USB peripheral authentication method in Embodiment 1.

Apparently, the above embodiments of the present invention are only examples of the present invention for purposes of clarity and are not intended to limit the implementations of the present invention. Changes or modifications in other different forms may also be made by a person of ordinary skill in the art on the basis of the above description. All implementations need not to be, and cannot be, exhaustive. Any modifications, equivalent replacements, improvements, etc. made within the spirit and principle of the present invention shall fall within the scope of protection of the claims of the present invention.

What is claimed is:

1. A Universal Serial Bus (USB) peripheral authentication method, characterized in that the method is applied to an embedded system which comprises a security unit, a storage unit and a processor, and the method comprises:

verifying an identity of a user and accessing a USB device authentication credential generation program for a legitimate user;

acquiring identity (ID) information of a USB device, ID information of the embedded system, and a salt value generated by a random number generator;

associating the ID information of the USB device, the ID information of the embedded system, and the salt value generated by the random number generator through the security unit, and using same as an input for generating a key pair and issuing a self-signed certificate;

inserting the ID information of the USB device, the ID information of the embedded system, the salt value, and the key pair in a storage area of the security unit, and returning the self-signed certificate and the salt value to the USB device or the user;

when the USB device is accessed, verifying whether the self-signed certificate and the salt value of the USB device or the user match the information in the storage area of the security unit; if yes, activating a USB communication function; otherwise, disabling the communication function of the USB device.

2. The USB peripheral authentication method according to claim 1, characterized in that after the step of accessing the USB device authentication credential generation program for the legitimate user, the method further comprises:

checking whether the accessed USB device has a storage function;

if the USB device has the storage function, after generating the key pair and issuing the self-signed certificate, storing the self-signed certificate and the salt value in a hidden partition of the USB device, and calling, during verification, the self-signed certificate and the salt value in the hidden partition of the USB device for verification;

and if the USB device does not have the storage function, setting a password after reading the USB device, returning the salt value to the user after the salt value is generated, storing the self-signed certificate in the storage area of the security unit, and reading, during verification, the password and the salt value entered by the user for verification.

3. The USB peripheral authentication method according to claim 2, wherein the step of calling the self-signed certificate and the salt value in the hidden partition of the USB device for verification comprises:

calling the salt value and the self-signed certificate in the hidden partition of the USB device, and searching for the key pair in the storage area of the security unit according to the salt value;

verifying the self-signed certificate through the key pair obtained by searching to determine whether the information of the self-signed certificate matches the information in the storage area of the security unit;

if yes, activating the communication function of the USB device; otherwise, disabling the communication of the USB device.

4. The USB peripheral authentication method according to claim 2, characterized in that the step of setting the password after reading the USB device comprises:

prompting the user to enter the password through a human-computer interaction interface;

receiving the password through a security keyboard of the security unit, calculating a hash value of the password in the security unit and storing same; and using the hash value of the password as one of the inputs to generate the key pair and issue the self-signed certificate.

5. The USB peripheral authentication method according to claim 4, characterized in that the step of reading, during verification, the password and the salt value entered by the user for verification specifically comprises:

prompting the user to input the salt value through the human-computer interaction interface;

acquiring a key according to the input salt value, and extracting a password hash value and verification information from the self-signed certificate through the key;

prompting the user to enter the password through the human-computer interaction interface;

calculating the hash value of the input password and comparing same with the password hash value in the self-signed certificate;

if the two hash values are consistent, determining whether the information of the self-signed certificate matches the information in the storage area of the security unit;

if yes, activating the communication function of the USB device; otherwise, disabling the communication of the USB device.

6. The USB peripheral authentication method according to claim 1, characterized in that the step of acquiring ID information of the USB device, ID information of the embedded system, and the salt value generated by the random number generator comprises:

reading the ID information of the USB device;

acquiring the ID information of the embedded system; and generating a random number through the random number generator of the security unit as the salt value.

7. The USB peripheral authentication method according to claim 1, characterized in that:

the ID information of the USB device comprises a device ID and a manufacturer ID, and the ID information of the embedded system comprises a manufacturer ID, a model ID and a processor ID.

8. The USB peripheral authentication method according to claim 1, characterized in that the security unit comprises one of Trusted Execution Environment (TEE) and Secure Element (SE).

9. A non-transitory storage medium, characterized in that the non-transitory storage medium has a computer program stored thereon, and the computer program, when executed by a processor, implements a Universal Serial Bus (USB) peripheral authentication method as follows:

verifying an identity of a user and accessing a USB device authentication credential generation program for a legitimate user;

acquiring identity (ID) information of a USB device, ID information of the embedded system, and a salt value generated by a random number generator;

associating the ID information of the USB device, the ID information of the embedded system, and the salt value generated by the random number generator through the security unit, and using same as an input for generating a key pair and issuing a self-signed certificate;

inserting the ID information of the USB device, the ID information of the embedded system, the salt value, and the key pair in a storage area of the security unit, and returning the self-signed certificate and the salt value to the USB device or the user;

when the USB device is accessed, verifying whether the self-signed certificate and the salt value of the USB device or the user match the information in the storage area of the security unit; if yes, activating a USB communication function; otherwise, disabling the communication function of the USB device.

10. The non-transitory storage medium according to claim 9, characterized in that after the step of accessing the USB device authentication credential generation program for the legitimate user, the method further comprises:

checking whether the accessed USB device has a storage function;

if the USB device has the storage function, after generating the key pair and issuing the self-signed certificate, storing the self-signed certificate and the salt value in a hidden partition of the USB device, and calling, during verification, the self-signed certificate and the salt value in the hidden partition of the USB device for verification;

and if the USB device does not have the storage function, setting a password after reading the USB device, returning the salt value to the user after the salt value is generated, storing the self-signed certificate in the storage area of the security unit, and reading, during verification, the password and the salt value entered by the user for verification.

11. The non-transitory storage medium according to claim 10, wherein the step of calling the self-signed certificate and the salt value in the hidden partition of the USB device for verification comprises:

calling the salt value and the self-signed certificate in the hidden partition of the USB device, and searching for the key pair in the storage area of the security unit according to the salt value;

verifying the self-signed certificate through the key pair obtained by searching to determine whether the information of the self-signed certificate matches the information in the storage area of the security unit;

if yes, activating the communication function of the USB device; otherwise, disabling the communication of the USB device.

12. The non-transitory storage medium according to claim 10, characterized in that the step of setting the password after reading the USB device comprises:

prompting the user to enter the password through a human-computer interaction interface;

receiving the password through a security keyboard of the security unit, calculating a hash value of the password in the security unit and storing same; and using the hash value of the password as one of the inputs to generate the key pair and issue the self-signed certificate.

13. The non-transitory storage medium according to claim 12, characterized in that the step of reading, during verification, the password and the salt value entered by the user for verification specifically comprises:

prompting the user to input the salt value through the human-computer interaction interface;

acquiring a key according to the input salt value, and extracting a password hash value and verification information from the self-signed certificate through the key;

prompting the user to enter the password through the human-computer interaction interface;

calculating the hash value of the input password and comparing same with the password hash value in the self-signed certificate;

if the two hash values are consistent, determining whether the information of the self-signed certificate matches the information in the storage area of the security unit;

if yes, activating the communication function of the USB device; otherwise, disabling the communication of the USB device.

14. The non-transitory storage medium according to claim 9, characterized in that the step of acquiring ID information of the USB device, ID information of the embedded system, and the salt value generated by the random number generator comprises:

reading the ID information of the USB device;

acquiring the ID information of the embedded system; and generating a random number through the random number generator of the security unit as the salt value.

\* \* \* \* \*